(12) United States Patent
Joseph et al.

(10) Patent No.: US 6,347,452 B1
(45) Date of Patent: Feb. 19, 2002

(54) METHOD OF MANUFACTURING A POROUS METAL HEAT SINK

(75) Inventors: Craig Joseph; Kelly W. Arnold, both of Santa Clara, CA (US)

(73) Assignee: United Defense LP, Santa Clara, CA (US)

( * ) Notice: Subject to any disclaimer, the term of this patent is extended or adjusted under 35 U.S.C. 154(b) by 0 days.

(21) Appl. No.: 09/708,183

(22) Filed: Nov. 7, 2000

(51) Int. Cl.[7] .............................................. B23P 15/26
(52) U.S. Cl. .................................... 29/890.03; 228/183
(58) Field of Search ...................... 29/890.03; 165/80.3, 165/80.2; 228/183

(56) References Cited

U.S. PATENT DOCUMENTS

| | | | |
|---|---|---|---|
| 3,873,805 A | * 3/1975 | Inoue | ...................... 29/890.03 |
| 3,973,718 A | * 8/1976 | Deschamps | |
| 6,286,212 B1 | * 9/2001 | Eaton | ...................... 29/890.03 |

* cited by examiner

Primary Examiner—I Cuda Rosenbaum
(74) Attorney, Agent, or Firm—The Kline Law Firm

(57) ABSTRACT

A method of manufacturing a heat sink for an inverter that utilizes a housing with a porous metallic interior formed from a large plurality of metal balls bonded together to provide a plurality of fluid flow paths. The metal balls serve as heat sinks to dissipate the heat in the fluid that flows through the heat sink. The metal balls must therefore be in thermally conductive contact with each other, and the bond area between the balls must be as large as is feasible to provide a sufficient heat path for the heat from the fluid. The heat sink is intended to be sued with an inverter for an electric motor, so the heat sink housing must be formed from molybdenum to accommodate mounting of circuitry. In order to be susceptible to receiving soldered components the molybdenum surface is nickel plated. The porous metal medium for the heat sink is formed from small (approximately 3/32" diameter) copper balls. Metallurgical bonding between the balls is achieved by silver plating the balls before brazing so that a copper-silver eutectic brazing compound is formed during the brazing process.

20 Claims, 2 Drawing Sheets

METHOD OF MANUFACTURING A POROUS METAL HEAT SINK

FIELD OF THE INVENTION

The present invention relates generally to manufacturing a heat sink for an inverter, and more particularly is a method of manufacturing a porous metal heat sink.

BACKGROUND OF THE INVENTION

Traction vehicles, such as locomotives or high power off-road vehicles, are driven by electrically powered traction motors which drive the wheels of the vehicle. The traction motors operate on AC power, but the power generated by the engine of the vehicle is DC. The DC potential generated by the engine must therefore be converted from DC to AC current in an inverter. The electric power generation/inversion requires the use of multiple semiconductor devices, and switches to control the semiconductor devices, all of which generate a great deal of heat. To dissipate the heat produced in the inverter, current art vehicles use either water or air cooling systems, or both in combination. These current art methods of cooling lead to several problems.

For any device to be air cooled, there must be adequate space around the device for air to flow in sufficient volume to remove the heat. Since traction motor applications typically utilize three-phase AC current, six IGBT (insulated gate bipolar transistor) switches must be employed. The power requirements of the motors will require that a capacitor bank be present in the inverter, along with the accompanying sensors, etc. The number of components required mandates a significant space requirement which is greatly exaggerated due to the need for space to accommodate air flow around the inverter.

In direct contradiction to the need for open space for cooling air flow is the fact that electrical devices function best in enclosed, non-ventilated environments. This kind of environment reduces the potential of contaminant buildup. Contaminant buildup can not only impede the desired heat transfer, but may also cause an electrical failure of the device. Therefore air cooling directly creates a situation detrimental to the function of the electrical device, in this case an inverter.

Because of the problems caused by air cooling, some current art devices utilize water cooling in the inverter. Water cooling can operate in a more controlled environment, but is generally not readily available. Engines in vehicles of the class which is the subject of this invention, those that utilize electrically powered traction wheels, are usually oil cooled. Thus, utilization of an inverter that requires water cooling leads to the necessity of including a water cooling system in an engine that would not otherwise have it. Still more space is required for the inverter.

Because of the size requirements demanded by the cooling systems of current art inverters, the inverter comprises a large unit contained in a compartment dedicated only to the inverter. This necessitates that lead wires for control and feedback systems must be fairly long, typically anywhere from 2 to 10 feet. Longer wires are by necessity heavier than shorter wires, both in terms of weight and electrical rating. Longer wires significantly increase the potential for distorted signals.

The inventors of this process have discovered a means to utilize an oil-cooled inverter that utilizes the same cooling system as is used for the engine of the vehicle. The improved inverter also drastically reduces the space required for the inverter in the engine compartment.

The improved inverter, which is the subject of a concurrently filed application, said application being incorporated by reference in its entirety herein, utilizes a heat sink which is a significant improvement over the prior art.

The requirements of the heat sink, and the objects of the present invention are as follows:

1. The heat sink must utilize a porous metal media which creates a plurality of pathways uniformly distributed through out the media to allow passage of the heat exchange fluid.
2. The metallic components in the porous metal media must be metallurgically bonded to each other to allow for conduction of heat through the porous media.
3. There must be a large surface-area-to-volume relationship to allow for convection heat transfer from the metallic substrate to the heat exchange fluid.
4. The porous metal media must be able to be metallurgically bonded to a thin molybdenum plate.
5. Once the porous metal media is metallurgically bonded to the molybdenum plate the opposite face must be prepared to allow for metallurgical attachment of the semiconductor devices.

SUMMARY OF THE INVENTION

The present invention is a method of manufacturing a heat sink with a porous metallic interior. The porous interior is formed from a large plurality of metal balls bonded together to provide a plurality of fluid flow paths. The metal balls serve as heat sinks to dissipate the heat in the fluid that flows through the heat sink. The metal balls must therefore be in thermally conductive contact with each other, and the bond area between the balls must be as large as is feasible to provide a sufficient heat path for the heat from the fluid.

In the application in which the heat sink of the present invention is used, an inverter for an electric motor, the heat sink housing must be formed from molybdenum. The inverter operates with a large number of silicon based chips. Molybdenum has a thermal expansion rate equal to that of silicon. Therefore, forming the heat sink housing from molybdenum allows the circuitry of the inverter to be mounted directly on the top surface of the heat sink, as the expansion and contraction of the heat sink housing will match that of the silicon substrate of the chips. Since both elements, the heat sink housing and the chip substrate, expand and contract at an equal rate during heating and cooling, the problem of the chip substrate cracking and breaking due to thermal flexing is eliminated.

However, in order to be susceptible to receiving soldered components, as is a key element of the inverter application, the molybdenum surface must be nickel plated. The nickel plating not only allows chips to be soldered to the surface of the heat sink, but also provides an improved bonding surface for the brazing process that secure the heat transfer media. The surfaces to be soldered are external, and an electrode-posited nickel plating is sufficient. However, the porous metallic media is brazed to an internal surface of the housing. To properly nickel plate the interior of the housing, it has been found by the inventors that an electroless process is optimal. When an electroless process is used for the interior of the housing, it is a simple matter to extend the process to the exterior as well.

When the porous metal medium has been placed in the interior of the heat sink housing, the end caps (manifolds) are bonded to the main heat sink body. This joint between the main body of the housing and the manifolds has minimal mechanical performance requirements, but the joint does have to seal the unit with a sufficiently strong bond so that pressurized fluid can flow through the heat sink.

For the preferred embodiment of the present invention, the porous metal medium is constructed by packing relatively small (approximately 3/32" diameter) balls together in the heat sink housing. The balls must be bonded together and the bond contact area must be sufficiently large to allow for heat conduction from ball to ball. The metallurgical bonding between the balls is achieved by plating a brazing compound of sufficient volume so that during a brazing cycle, a sufficient volume of liquid is produced to allow wetting at contact points between the balls to increase the size of the conductive heat transfer paths.

In the preferred embodiment, a copper ball is used as the basis for the porous metal medium in order to optimize conductive heat transfer, and because copper has the necessary ductility to allow the manufacture, with currently available technology, of balls of the small size required. However, copper alloys are susceptible to hydrogen embrittlement, so the composition of the balls must be controlled to allow for the necessary thermal processing required during brazing. An OFHC (Oxygen Free High Conductivity) copper alloy was selected. A copper-silver eutectic brazing compound is formed on the surface of the balls during the thermal processing.

An advantage of the present invention is that a heat sink that utilizes a porous metal medium as the heat exchange element is formed. Fluid used to cool an engine of a vehicle flows through the heat sink to serve as a coolant for an inverter.

Another advantage of the present invention is that the heat sink accomplishes the same amount of heat transfer as prior art devices with vastly larger size and weight requirements.

A still further advantage of the present invention is that it provides a molybdenum based housing to which electronic components can be soldered.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
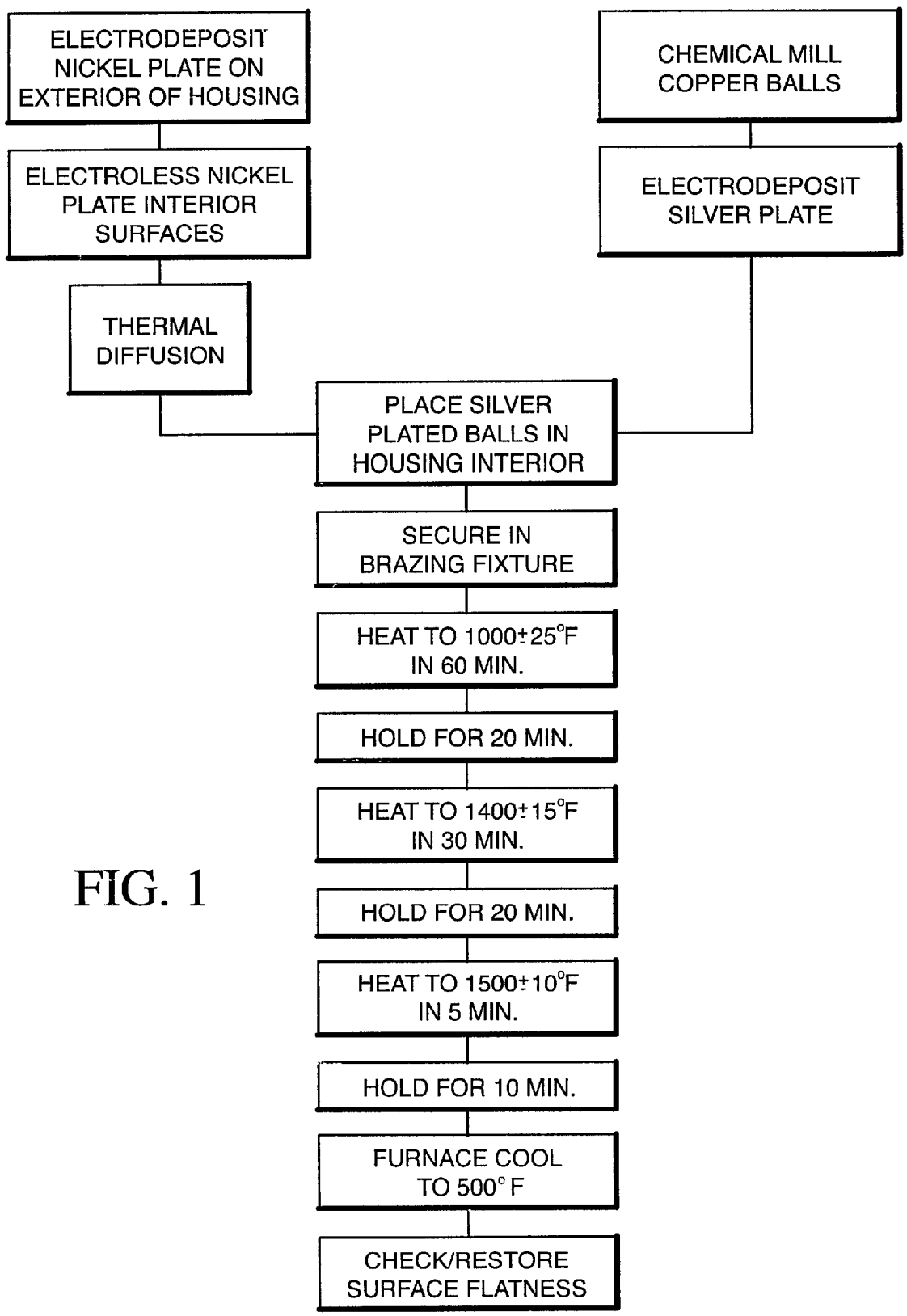
FIG. 1 is a schematic flow chart of the process of the present invention.
Figure 2:
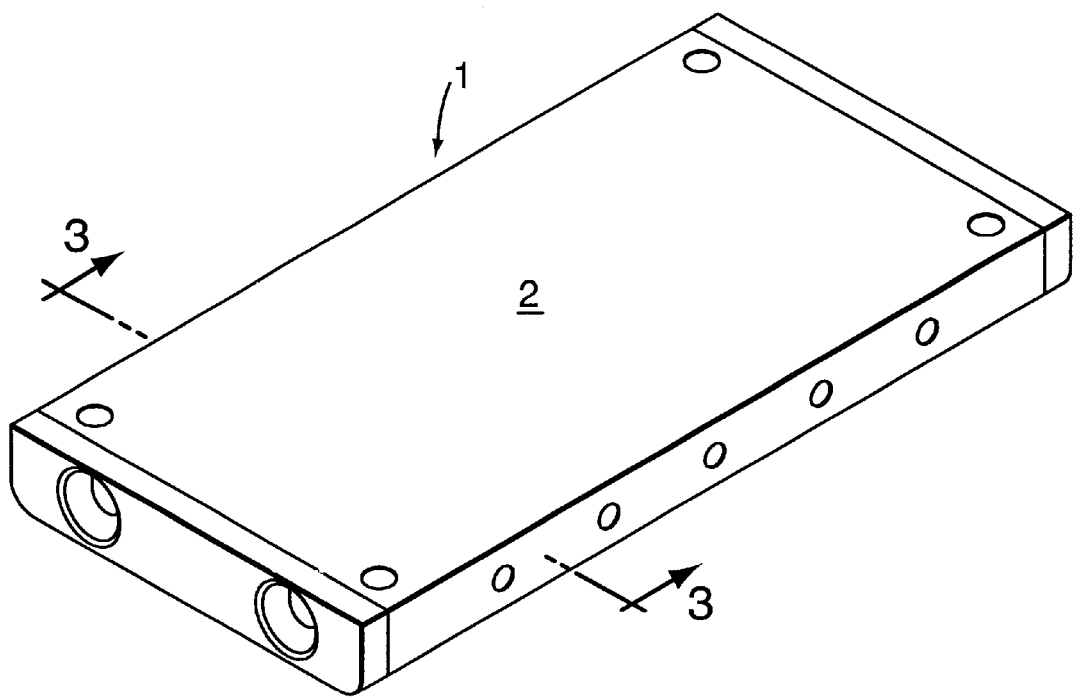
FIG. 2 is a perspective view of a heat sink formed according to the process of the present invention.
Figure 3:
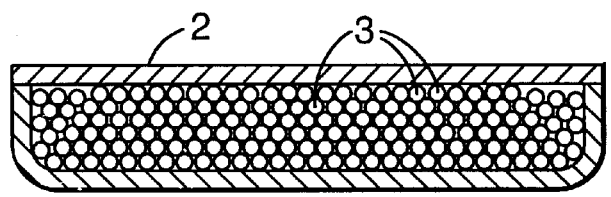
FIG. 3 is a sectional view taken along line 3—3 in FIG. 2.

The present invention is a method of manufacturing a heat sink 1 with a porous metallic interior that allows fluid flow through passageways in the interior. The porous interior is formed from a large plurality of metal balls 3 bonded together to provide a plurality of fluid flow paths. The metal balls 3 serve as heat sinks for the fluid that flows through the heat sinks, and thus the metal balls must be in thermally conductive contact with each other. Thus the bond area between the balls must be as large as is feasible to provide a sufficient dissipation path for the heat from the fluid.

In the application in which the heat sink of the present invention is used, an inverter for an electric traction motor, the heat sink housing 2 must be formed from molybdenum. The inverter operates with a large number of silicon based chips. Molybdenum has a thermal expansion rate equal to that of silicon. Therefore, forming the heat sink housing 2 from molybdenum allows the circuitry of the inverter to be mounted directly on the top surface of the heat sink, as the expansion and contraction of the heat sink housing will match that of the silicon substrate of the chips. Since both elements, the heat sink housing 2 and the chip substrate, expand and contract at an equal rate during heating and cooling, the problem of the chip substrate cracking and breaking due to thermal flexing is eliminated.

However, in order to be able to receive soldered electronic components, a key element of the inverter application, the molybdenum surface must be nickel plated. The nickel plating not only allows chips to be soldered (with Pb—Sn solder) to the surface of the heat sink, but also provides an improved bonding surface for the brazing process. The surfaces intended to receive the electronic components being soldered are external, and an electrodeposited nickel plating is sufficient. However, the porous metallic media is brazed to an internal surface of the housing. It has been found by the inventors that an electroless process is optimal to properly nickel plate the interior of the housing. When the electroless process is used, it is used for both the interior and exterior of the housing.

Although molybdenum is very difficult to nickel plate, the inventors have found that a suitable nickel plating is produced on the exterior of the housing by flash coating with an electrodeposit process. While an electrodeposit process may be used to prepare the interior surfaces of the housing, it has been discovered by the inventors that the plating process of the interior is significantly improved by flash coating with an electroless process utilizing boron electroless nickel. After flash coating exterior and interior surfaces, the heat sink housing components are heated to 780–800° C. for approximately one hour in a thermal diffusion process. The thermal diffusion process may be performed in either a hydrogen atmosphere or in a vacuum.

In the preferred embodiment, the housing is formed as a rectangular enclosure. The walls are approximately 0.90" thick, and the interior space is 0.5" high. It is envisioned by the inventors that various shapes and size of the inverter may be utilized, according to the requirements of specific applications.

For the preferred embodiment of the present invention, the porous metal heat transfer medium is constructed by packaging relatively small balls together (approximately 3/32" diameter balls) in the interior of the heat sink housing. The balls have to be bonded to each other and to the manifold with a maximum bond contact area in order to allow for optimal heat conduction. The metallurgical bonding between the balls is achieved by first plating a brazing compound on the balls. The key consideration in the plating process is to provide a sufficient plating layer so that during a brazing cycle, a sufficient volume of liquified material is produced to provide wetting at contact points between the balls to increase the size of the conductive heat transfer paths.

It should be clear that many different materials and shapes can be chosen for the individual heat transfer media. However, in the preferred embodiment, a copper ball is used. Because copper alloys are susceptible to hydrogen embrittlement, the composition of the balls must be controlled to allow for the thermal processing required during the brazing process. In the preferred embodiment, an OFHC (Oxygen Free High Conductivity) copper alloy ball is utilized.

The alloy must be free of contaminants to be properly bonded in the brazing process. For this reason, the commercially available copper balls are first chemical milled to remove a significant amount of material from the surface of the balls. The degree of material removal necessary is defined by the condition of the balls as purchased.

A copper-silver eutectic brazing compound is used to bond the balls together. The eutectic copper-silver alloy is produced by first plating silver onto the copper balls, and then thermally processing the resultant matrix to achieve the proper amount of liquification. In the preferred embodiment, the balls are prepared by electrodepositing a 0.5 mil thick layer of dull silver onto the copper balls.

After the balls have been silver plated, they are introduced into the interior of the heat sink housing. The housing is then secured in a brazing fixture. With an appropriate fixture, the brazing of the individual elements of the porous metal heat transfer medium and the securing of the manifolds to the heat sink housing can be performed concurrently. The following thermal cycling is used during the brazing process:

a) Heat to 1000±25° F. in 60 min.
b) Hold at 1000±25° F. for 20 min.
c) Heat to 1400±15° F. in 30 min.
d) Hold at 1400±15° F. for 20 min.
e) Heat to 1500±10° F. in 5 min.
f) Hold at 1500±10° F. for 10 min.
g) Furnace cool to 500° F.

The resultant heat sink is then ready for installation on the inverter.

Because one surface of the heat sink is used as a mounting area for the inverter circuitry, that surface must be relatively flat. Occasionally during the brazing process, the bonding of the balls to the wall of the housing causes excessive deformation of the housing. The amount of acceptable variance from flat will vary according to the specific application. If the brazing process takes the surface of the heat sink outside acceptable tolerances, additional processing is required.

The flatness of the heat sink wall can be restored by resurfacing and re-plating the wall. It has also been discovered that the flattening of the wall can be accomplished by a coining process. The coining process simply involves applying high pressure to the housing (a cold forming process) until the surface is brought within acceptable flatness limits.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A process for forming a heat sink comprising:
a) nickel plating exterior and interior surfaces of a molybdenum heat sink housing,
b) subjecting said heat sink housing to a thermal diffusion process,
c) silver plating a plurality of metal balls,
d) placing said metal balls in an interior of said heat sink housing,
e) securing said heat sink housing in a brazing fixture, and
f) thermally processing said heat sink housing and said metal balls; such that
said silver layer and surface metal material of each said metal ball liquifies to form a bond with adjacent ones of said metal balls and to any contacting surfaces of said heat sink housing, and
said metal balls form a plurality of fluid throughways in said interior of said heat sink housing.

2. The process of claim 1 wherein:
said thermal processing comprises;
a) heating said heat sink housing and said metal balls to 1,000° F.±25° F. in sixty minutes,
b) holding said heat sink housing and said metal balls at 1,000° F.±25° F. for twenty minutes,
c) heating said heat sink housing and said metal balls to 1,400° F.±15° F. in thirty minutes,
d) holding said heat sink housing and said metal balls at 1,400° F.±15° F. for twenty minutes,
e) heating said heat sink housing and said metal balls to 1,500° F.±10° F. in five minutes,
f) holding said heat sink housing and said metal balls at 1,500° F.±10° F. for ten minutes, and
g) furnace cooling said heat sink housing and said metal balls to 500° F.

3. The process of claim 1 wherein:
nickel plating of said exterior and interior surfaces of said heat sink housing is accomplished by an electrodeposit process.

4. The process of claim 1 wherein:
nickel plating of said exterior and interior surfaces of said heat sink housing is accomplished by an electroless process.

5. The process of claim 1 wherein:
said thermal diffusion process is performed at 780–800° C.

6. The process of claim 5 wherein:
said thermal diffusion is performed in a hydrogen atmosphere.

7. The process of claim 5 wherein:
said thermal diffusion is performed in a vacuum.

8. The process of claim 1 wherein:
said metal balls are chemical milled prior to silver plating.

9. The process of claim 1 wherein:
said metal balls are made of copper.

10. The process of claim 1 wherein:
said silver plating process deposits a layer of dull silver 0.5 mil thick on said copper balls.

11. The process of claim 1 wherein:
end manifolds of said heat sink housing are secured to a main body of said heat sink housing during said thermal processing.

12. A process for forming a heat sink comprising:
a) nickel plating exterior and interior surfaces of a molybdenum heat sink housing,
b) subjecting said heat sink housing to a thermal diffusion process,
c) silver plating a plurality of copper balls so that a silver layer is formed on an exterior of said copper balls,
d) placing said copper balls in an interior of said heat sink housing,
e) securing said heat sink housing in a brazing fixture,
f) heating said heat sink housing and said copper balls to 1,000° F.±25° F. in sixty minutes,
g) holding said heat sink housing and said copper balls at 1,000° F.±25° F. for twenty minutes,
h) heating said heat sink housing and said copper balls to 1,400° F.±15° F. in thirty minutes, i) holding said heat sink housing and said copper balls at 1,400° F.±15° F. for twenty minutes, j) heating said heat sink housing and said copper balls to 1,500° F.±10° F. in five minutes, k) holding said heat sink housing and said copper balls at 1,500° F.±10° F. for ten minutes, and l) furnace cooling said heat sink housing and said copper balls to 500° F.; such that said silver layer and surface copper material of each said copper ball liquifies to form a bond with adjacent ones of said copper balls and to any contacting surfaces of said heat sink housing, and said copper balls form a plurality of fluid throughways in said interior of said heat sink housing.

13. The process of claim 12 wherein:

nickel plating of exterior surfaces of said heat sink housing is accomplished by an electrodeposit process.

14. The process of claim 12 wherein:

nickel plating of exterior surfaces of said heat sink housing is accomplished by an electroless process.

15. The process of claim 12 wherein:

said thermal diffusion process is performed at 780–800° C.

16. The process of claim 15 wherein:

said thermal diffusion is performed in a hydrogen atmosphere.

17. The process of claim 15 wherein:

said thermal diffusion is performed in a vacuum.

18. The process of claim 12 wherein:

said copper balls are chemical milled prior to silver plating.

19. The process of claim 12 wherein:

said silver plating process deposits a layer of dull silver 0.5 mil thick on said copper balls.

20. The process of claim 12 wherein:

end manifolds of said heat sink housing are secured to a main body of said heat sink housing during thermal cycling.

* * * * *